United States Patent
Chung

Patent Number: 6,046,729
Date of Patent: Apr. 4, 2000

[54] Z AXIS DEVICE OF A COMPUTER MOUSE

[75] Inventor: Yung-Chou Chung, Taipei Hsien, Taiwan

[73] Assignee: Primax Electronics Ltd., Taipei, Taiwan

[21] Appl. No.: 09/046,597

[22] Filed: Mar. 24, 1998

[51] Int. Cl.⁷ .................................................. G09G 5/08
[52] U.S. Cl. ........................................... 345/164; 345/167
[58] Field of Search ................................... 345/163, 164, 345/165, 166, 167

[56] References Cited

U.S. PATENT DOCUMENTS

| | | | |
|---|---|---|---|
| 3,987,685 | 10/1976 | Opocensky | 345/164 |
| 4,562,314 | 12/1985 | Hosogoe et al. | 345/164 |
| 4,612,539 | 9/1986 | Hosogoe et al. | 345/164 |
| 4,806,917 | 2/1989 | Hosogoe | 345/164 |
| 5,436,616 | 7/1995 | Futatsugi et al. | 345/164 |
| 5,559,534 | 9/1996 | Lin | 345/165 |
| 5,565,890 | 10/1996 | Wu et al. | 345/167 |
| 5,717,427 | 2/1998 | Lin | 345/164 |
| 5,760,765 | 6/1998 | Wu | 345/163 |
| 5,790,098 | 8/1998 | Lin | 345/163 |
| 5,828,364 | 10/1998 | Siddiqui | 345/163 |

*Primary Examiner*—Steven J. Saras
*Assistant Examiner*—Paul A. Bell
*Attorney, Agent, or Firm*—Bacon & Thomas

[57] ABSTRACT

A computer mouse having an improvement of Z axis device is disclosed. The computer mouse includes a roller ball. The Z axis device includes a spring member having a spiral portion, a first art portion and a second arm potion, a first positioning element for positioning the spiral portion of the spring member, a second positioning element for positioning the first arm portion of the spring member, a rotation member having a hole for allowing the second arm portion to be inserted therein, one surface of the rotation member is engaged with the roller ball, and a rotation member positioning element for sustaining the second arm portion for allowing the rotation member to be positioned on the rotation member positioning element. The objective of the present invention is to provide a simple ad low cost Z axis device.

4 Claims, 5 Drawing Sheets

Z AXIS DEVICE OF A COMPUTER MOUSE

BACKGROUND OF THE INVENTION

1. Field of the invention

The present invention relates to an improved structure of a computer mouse, and particularly, to an improved Z axis device which can be simply assembled and reduce costs in manufacturing the computer mouse.

2. Description of the Prior Art

A traditional computer mouse for generating a 2-dimentional cursor control signal usually comprises X, Y optical wheels and Z axis device. An X-shaft and a Y-shaft orthogonally extend from the center portion of each of the X-wheel and the Y-wheel, respectively, while the X-shaft and the Y-shaft are perpendicular to each other. The Z axis device is located at a 45 degree position correspondent to the X-shaft and the Y-shaft.

During the rotation of the roller ball of the computer mouse, the X-shaft and the Y-shaft have to be constantly in contact with the roller ball so that the X-wheel and the Y-wheel can be simultaneously rotated with the roller ball. The cursor control signal will be wrongly detected if the aforementioned simultaneous rotation is not well maintained. To keep close contact between the X-shaft, the Y-shaft and the roller ball, one of the methods is to press the roller ball toward the X-shaft and the Y-shaft via the Z axis device's force.

A prior Z axis device, which is illustrated in FIG. 1, comprises a Z axis roller 10, a positioning slot 11 and a roller base 12. The Z axis roller 10 is mounted on the roller base 12 and the roller base 12 is suspended in the positioning slot 11. Then the two ends of a spring 13 are engaged with the roller base 12 and the positioning slot, respectively, thus to assemble the Z axis device which is shown in FIG. 2.

The Z axis device depicted above comprises more components which will consume higher costs as expected.

SUMMARY OF THE INVENTION

It is therefore a primary object of the present invention to provide an improved Z axis device which can be easily assembled and reduce manufacturing costs.

Briefly, the Z axis device of a computer mouse having a roller ball according to the present invention includes:

- a spring member having a spiral portion, a first arm portion and a second arm portion;
- a first positioning element for positioning the spiral portion of the spring member;
- a second positioning element for positioning the first arm portion of the spring member;
- a rotation member having a hole for allowing the second arm portion to be inserted therein, one surface of the rotation member engaging with the roller ball; and
- a rotation member positioning element for sustaining the second arm portion for allowing the rotation member to be positioned on the rotation member positioning element.

In accordance with one aspect of the present invention, the rotation member positioning element includes two parallel supporting members each of which having a concave portion so that the second arm portion can be positioned between the two supporting member for allowing the rotation member to be located thereon.

In accordance with another aspect of the present invention, the first positioning element is a post which is utilized to cover the spiral portion of the spring member, and the second positioning element is a block piece for maintaining the first arm portion.

In accordance with another aspect of the present invention, the Z axis device further includes a cylindrical sleeve to be mounted on the post to avoid departure of the spiral portion from the post.

These and other objects and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENTS

Figure 1:
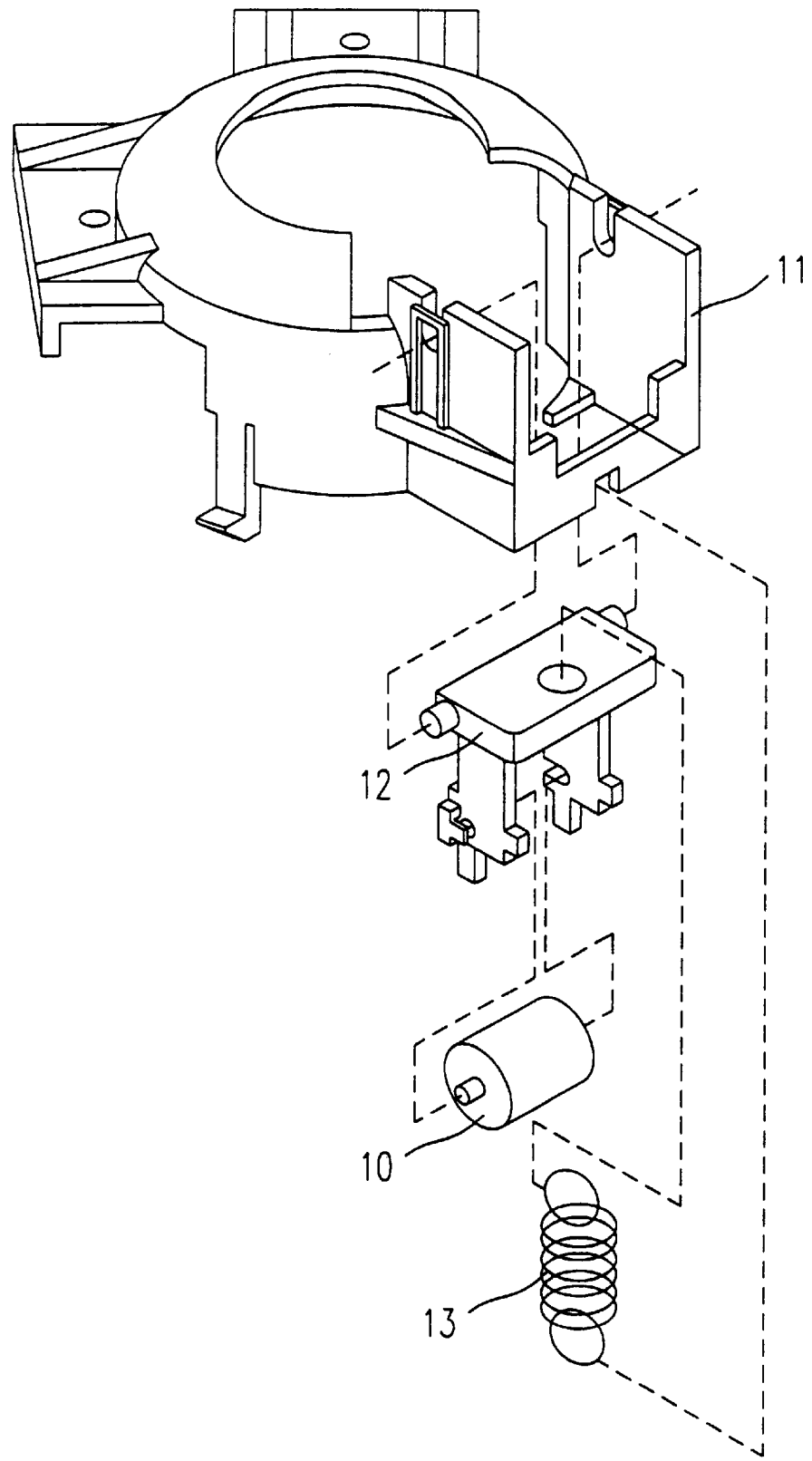
FIG. 1 illustrates a perspective view of a Z axis device of a traditional computer mouse.
Figure 2:
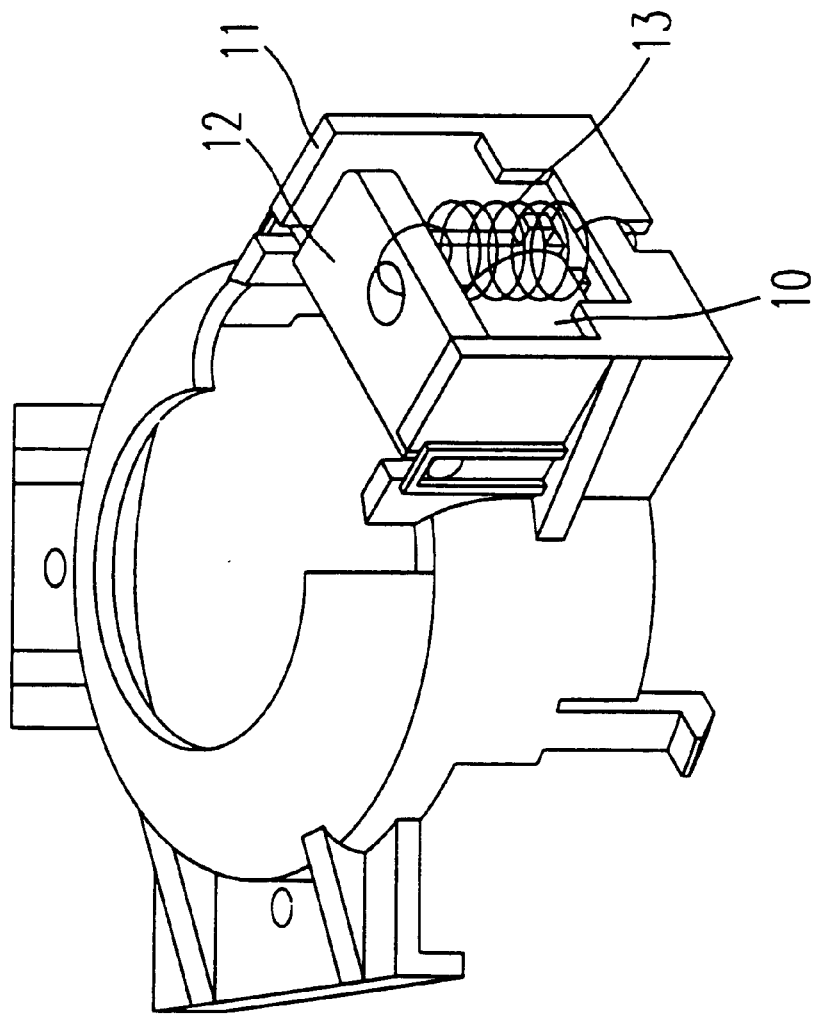
FIG. 2 illustrates an assembly of the traditional Z axis device shown in FIG. 1.
Figure 3:
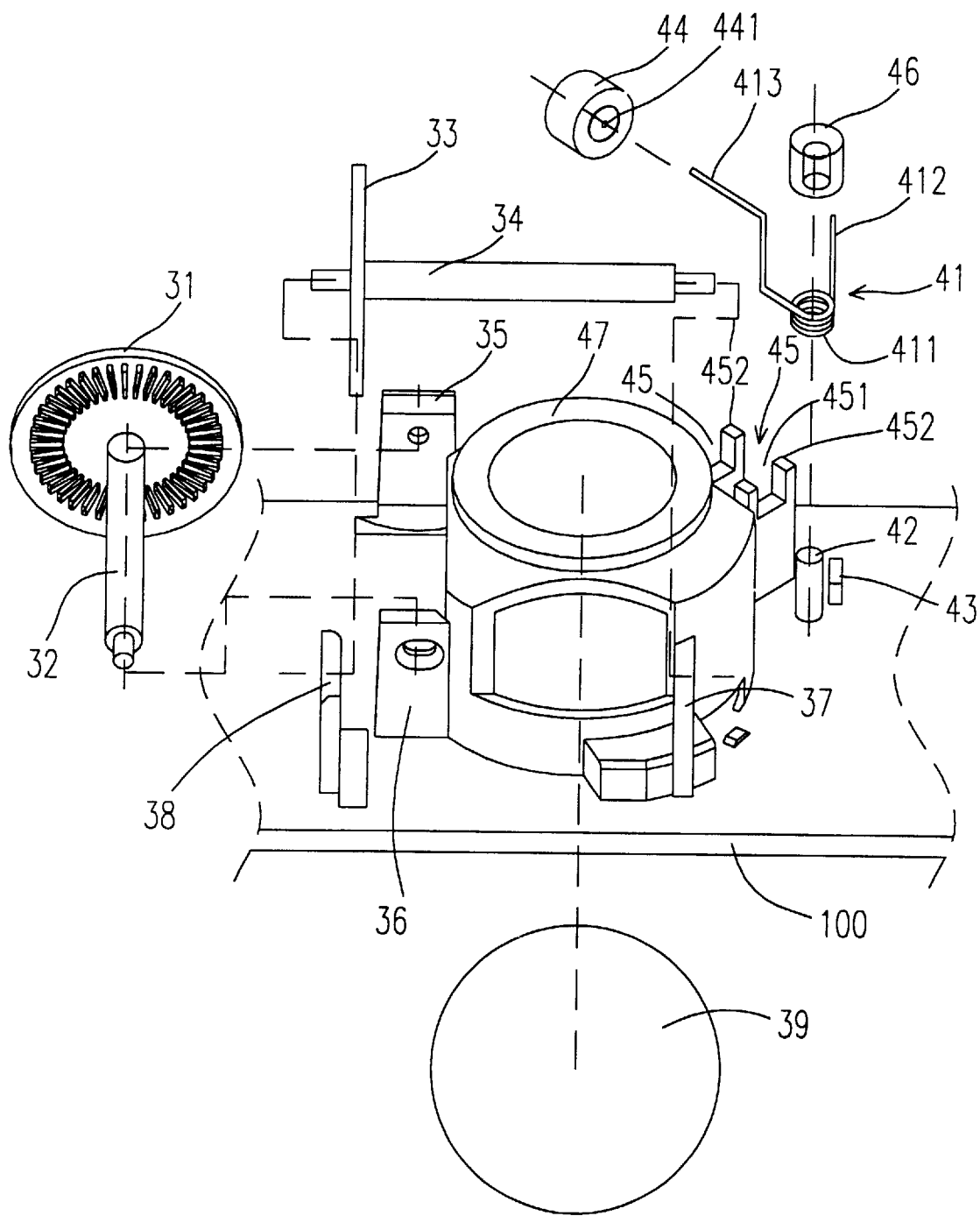
FIG. 3 is a perspective view of the internal structure of a computer mouse and a preferred embodiment of an improved Z axis device thereof according to the present invention.

Referring to FIG. 3, it is a perspective view of the internal structure of a computer mouse and a preferred embodiment of an improved Z axis device thereof according to the present invention. The internal structure comprises an X optical wheel 31, an X-shaft 32, a Y optical wheel 33, a Y-shaft 34, X-shaft engaging members 35, 36, Y-shaft engaging members 37, 38, a roller ball 39 and a ball cage 47. The present Z axis device includes a spring member 41, a first positioning element 42, a second positioning element 43, a rotation member 44, a rotation member positioning element 45 and a cylindrical sleeve 46. When the spring member 41 further includes a spiral portion 411, a first a, portion 412 and a second arm portion 413. The first positioning element 42 is a post, the second positioning element 43 is a block piece, while the rotation member positioning element 45 includes two parallel supporting members 452 each of which having a concave portion 451. It's preferred that the X-shaft engaging members 35, 36, the Y-shaft engaging members 37, 38, the ball cage 47 and the two supporting members 451 are integrated in one piece, while the post 42 and the block piece 43 ate located on a bottom cover 100 of the computer mouse and also integrated with the bottom cover 100 in a same manner as above.

Figure 4:
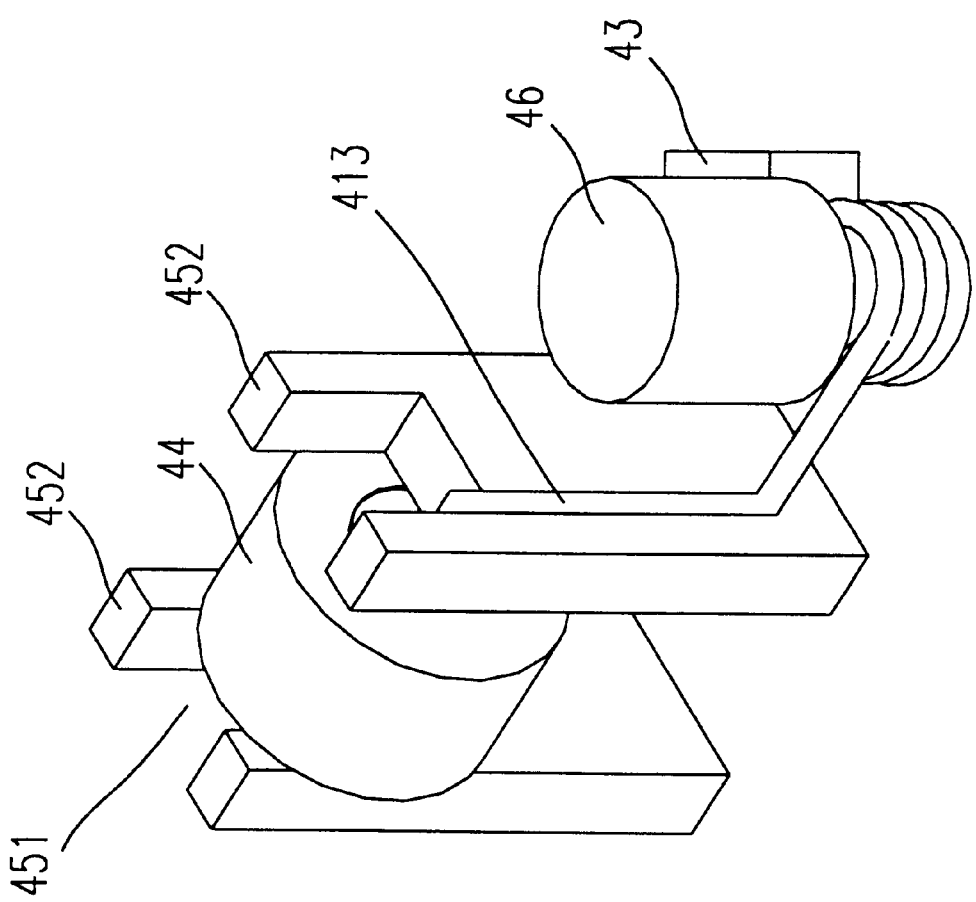
FIG. 4 illustrates an assembly of the preferred Z axis device according to the present invention.
Figure 5:
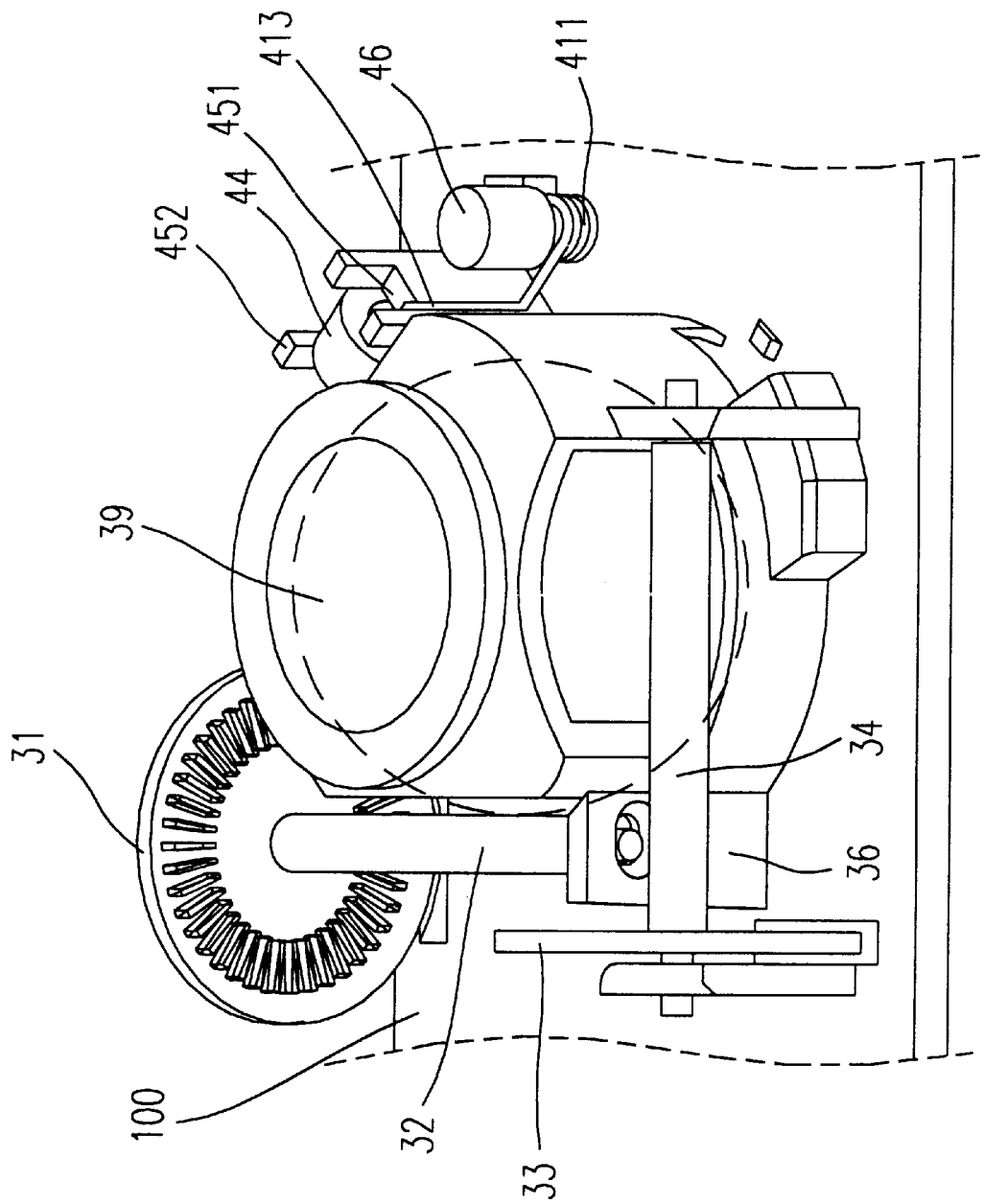
FIG. 5 illustrates an assembly of the internal structure of the computer mouse shown in FIG. 3.

The X-shaft 32 and the Y-shaft 32, 34 are inserted into holes of the X-shaft and Y-shaft engaging members 35, 36, 37, 38, respectively, for allowing the X-wheel 31 and the Y-wheel 33 to be positioned thereon. The ball cage 47 is used to accomodate the roller ball 39. The assembly process of the Z axis device is as follows: a)to install the spiral portion 411 of the spring member 41 over the post 42; b)to press the first arm portion 412 against the block piece 43; c)to insert the second arm portion 413 into a hole 441 of the rotation member 44; and d)to mount the second arm portion 413 over the two slots 451 of the two supporting members 452 for allowing the rotation member 45 to be positioned thereon. The cylindrical sleeve 46 is used to cover the post 42 to avoid possible departure of the spiral portion 411 from the post 42. FIG. 4 illustrates the assembled Z axis device, FIG. 5 illustrates an assembly of the internal structure of the computer mouse shown m FIG. 3. A bias force is generated by the first arm portion 412 of the spring member 41 against We block piece 43, the second arm portion 413 is inserted in the hole 441 of the rotation member 44 for being mounted over the two supporting members 452 and then retained at the inner wall of the slots 451. The roller bay 39 is pressed by the rotation member 44 which is forced by the bias force geared by the second arm portion 413 toward the X-shaft 32 and the Y-shaft 34.

The above disclosure is not intended as limiting. Those skilled in the art will readily observe that numerous modifications and alterations of the system may be made while retaining the teachings of the invention. Accordingly the above disclosure should be construed as limited only by the metes and bounds of the appended claims.

What is claimed is:

1. A Z axis device of a computer mouse having a roller ball, said Z axis device comprising:

a spring member having a spiral portion, a first arm portion and a second and portion;

a first positioning element for positioning said spiral portion of said spring member;

a second positioning element for positioning said first arm portion of said spring member;

a rotation member having a hole for allowing said second arm portion to be inserted therein, one surface of said rotation member engaging with said roller ball; and a rotation member positioning element for sustaining said second arm portion for allowing said rotation member to be positioned on said rotation member positioning element.

2. The Z axis device of claim 1 wherein said rotation member positioning element includes two parallel supporting members each of which having a concave portion so that said second arm portion can be positioned between said two supporting members for allowing said rotation member to be located thereon.

3. The Z axis device of claim 2 wherein said first positioning element is a post which is utilized to cover said spiral portion of said spring member, and said second positioning element is a block piece for maintaining said first arm portion.

4. The Z axis device of claim 2 further comprises a cylindrical sleeve to be mounted on said post to avoid departure of said spiral portion from said post.

* * * * *